United States Patent [19]

Fujisawa et al.

[11] Patent Number: 5,155,646
[45] Date of Patent: Oct. 13, 1992

[54] MULTIPLE LAYERED THIN-FILM MAGNETIC HEAD FOR MAGNETIC RECORDING AND REPRODUCING APPARATUS

[75] Inventors: Wataru Fujisawa, Zushi; Shuji Orihara, Yokosuka; Takaharu Nishino, Sagamihara; Hisanori Yoshimizu, Yokohama, all of Japan

[73] Assignee: Victor Company of Japan, Ltd., Yokohama, Japan

[21] Appl. No.: 557,021

[22] Filed: Jul. 25, 1990

[30] Foreign Application Priority Data

| Jul. 26, 1989 | [JP] | Japan | 1-193469 |
| Aug. 30, 1989 | [JP] | Japan | 1-223470 |
| Aug. 31, 1989 | [JP] | Japan | 1-226152 |
| Sep. 12, 1989 | [JP] | Japan | 1-236076 |

[51] Int. Cl.⁵ ............................................. G11B 5/31
[52] U.S. Cl. ............................................. 360/126
[58] Field of Search ........................ 360/126; 29/603

[56] References Cited

U.S. PATENT DOCUMENTS

| 4,860,139 | 8/1989 | Hamilton | 360/126 |
| 4,872,079 | 10/1989 | Roberts | 360/126 |
| 4,943,882 | 7/1990 | Wada et al. | 360/126 |
| 4,970,615 | 11/1990 | Gau | 360/126 |
| 5,027,246 | 6/1991 | Numazawa et al. | 360/126 |

Primary Examiner—Robert S. Tupper
Attorney, Agent, or Firm—Pollock, VandeSande & Priddy

[57] ABSTRACT

A thin-film magnetic head for magnetic recording and reproducing apparatus includes a lower insulating layer deposited on a substrate and including a lower magnetic core, an intermediate insulating layer deposited on the lower insulating layer and including front and rear intermediate magnetic cores, and an upper insulating layer deposited on the intermediate insulating layer and including an upper magnetic core. The magnetic cores make up a magnetic circuit which has a magnetic gap defined between the lower magnetic core and the front intermediate magnetic core or between the front intermediate magnetic core and the upper magnetic core. A multiturn coil is embedded in the intermediate insulating layer to surround the rear intermediate magnetic core. The lower, intermediate, and upper insulating layers have respective flat surfaces including respective surfaces of the lower, intermediate, and upper magnetic cores. The lower, intermediate, and upper insulating layers are joined to each other through the flat surfaces.

16 Claims, 11 Drawing Sheets

MULTIPLE LAYERED THIN-FILM MAGNETIC HEAD FOR MAGNETIC RECORDING AND REPRODUCING APPARATUS

BACKGROUND OF THE INVENTION

The present invention relates to a thin-film magnetic head for use in magnetic recording and reproducing apparatus, and more particularly to a thin-film magnetic head suitable for high-density magnetic recording.

Heretofore, thin-film magnetic heads comprise a magnetic layer deposited on a substrate by a vacuum thin-film fabrication process and patterned into a core configuration by photolithography or etching, a coil and an insulating layer deposited on the magnetic layer, and another magnetic layer deposited on the insulating layer. The magnetic layers jointly constitute a magnetic circuit of the thin-film magnetic head.

The conventional thin-film magnetic heads have surface steps or irregularities due to stepped configurations of the layers and coil. The surface steps or irregularities tend to lower the resolution with which the layers and coil are shaped by photolithography. With the low photolithographic resolution, the turns of the coil cannot be reduced in pitch unless the magnetic layers above and below the coil are increased in length. If the length of the magnetic layers are increased, however, the magnetic path is also increased and so is the magnetic reluctance of the magnetic circuit. Accordingly, the conventional thin-film magnetic heads are poor in performance.

The surface steps of irregularities also prevent the thickness of the coil from being increased. Therefore, the electric resistance of the coil is relatively large, resulting in a concomitant reduction in the magnetic pole excitation efficiency.

Because of the surface steps or irregularities, an external lead extending over the uppermost magnetic layer is bent and turned in order to be connected to coil conductors joined to the coil. Therefore, the external lead is liable to be short-circuited.

SUMMARY OF THE INVENTION

An object of the present invention relates to a thin-film magnetic head which is free of surface steps or irregularities and hence has accurately dimensioned magnetic cores and coil pattern, so that the thin-film magnetic head has high magnetic performance.

Another object of the present invention is to provide a thin-film magnetic head which prevents an external lead connected thereto from short-circuiting.

Still another object of the present invention is to provide a thin-film magnetic head which has a low magnetic reluctance and minimizes leakage fluxes between upper and lower magnetic cores.

Yet another object of the present invention is to provide a thin-film magnetic head which has an accurate track width and is free from voids in magnetic layers, magnetic saturation, and false gaps.

According to the present invention, a thin-film magnetic head including first, second, and third insulating layers deposited successively on a substrate, the first, second, and third insulating layers having first, second, and third magnetic cores filled in respective grooves defined in the first, second, and third insulating layers. A coil is embedded in the second insulating layer in surrounding relation to a portion of the second magnetic core. The first, second, and third magnetic cores jointly provide a magnetic circuit, the magnetic circuit having a magnetic gap between two of the first, second, and third magnetic cores. The first, second, and third insulating layers have respective flat surfaces including respective surfaces of the first, second, and third magnetic cores, the first, second, and third insulating layers being joined to each other through the flat surfaces.

The second magnetic core has parallel side walls extending across the second insulating layer, or inclined side walls tapered toward the magnetic gap.

The thin-film magnetic head further includes a dry-etching resistant layer interposed between the first and second insulating layers or between the second and third insulating layers. The dry-etching resistant layer is made of a metal, a metal oxide, or a metal fluoride. The magnetic gap is defined by the dry-etching resistant layer.

The magnetic head further includes an external lead disposed on the flat surface of the third insulating layer and connected to the coil.

The second insulating layer comprises a plurality of intermediate insulating layers.

The first, second, and third magnetic cores have first, second, and third widths, respectively, parallel to the magnetic gap, the second width being greater than the first width, the first width defining a track width of the thin-film magnetic head. Alternatively, the second width is greater than the third width, the third width defining a track width of the thin-film magnetic head.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 4 is a cross-sectional view taken along line XIV—XIV of FIG. 13;

DETAILED DESCRIPTION

Figure 1:
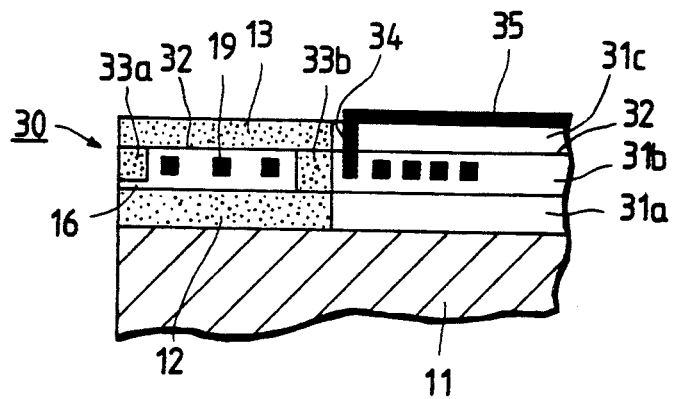
FIG. 1 is a fragmentary cross-sectional view of a thin-film magnetic head according to an embodiment of the present invention.

Like or corresponding parts are denoted by like or corresponding reference numerals throughout the figures.

FIG. 1 schematically shows a thin-film magnetic head 30 according to an embodiment of the present invention, the thin-film magnetic head 30 being fragmentarily shown in transverse cross section.

The thin-film magnetic head 30 comprises a flat lower insulating layer 31a and a flat lower magnetic core 12 which are deposited on a substrate 11, the lower magnetic core 12 being filled in a groove defined in the lower insulating layer 31a near a surface 15 against which a magnetic recording medium (not shown) slides. The lower insulating layer 31a and the lower magnetic core 12 have upper surfaces lying flush with each other.

The thin-film magnetic head 30 also has a flat intermediate insulating layer 31b deposited on the upper surfaces of the lower insulating layer 31a and the lower magnetic core 12. The intermediate insulating layer 31b includes a front intermediate magnetic core 33a embedded therein at an end thereof near the sliding surface 15. The intermediate magnetic core 33a is spaced from the lower core 12 by a magnetic gap 16, which is filled with the insulating material of the intermediate insulating layer 31b. The intermediate insulating layer 31b also includes a rear intermediate magnetic core 33b embedded therein spaced a certain distance from the intermediate magnetic core 33a in a direction away from the sliding surface 15. The intermediate magnetic core 33b is held in direct contact with the lower magnetic core 12.

The thin-film magnetic head 30 further includes a flat upper insulating layer 31c and an upper magnetic core 13 which are deposited on the intermediate insulating layer 31b. The upper magnetic core 13 is positioned near the sliding surface 15 and has opposite ends joined to the intermediate magnetic cores 33a, 33b. The lower magnetic core 12, the intermediate magnetic cores 33a, 33b, and the upper magnetic core 13 jointly constitute the magnetic circuit of the thin-film magnetic head 30.

A flat multiturn coil 19 is spirally embedded in the intermediate insulating layer 31b surround to the rear intermediate magnetic core 33b. The coil 19 has a terminal connected to an external lead 35 of Cu through a conductor that is placed in a through hole 34 defined in the upper insulating layer 31c. The external lead 35 is placed on the upper surface of the upper insulating layer 31c for electric connection to an external device, so that the multiturn coil 19 can be electrically connected to the external device.

The thin-film magnetic head 30 is therefore composed of three flat insulating layers, i.e., the lower, intermediate, and upper insulating layers 31a, 31b, 31c. The magnetic circuit of the thin-film magnetic head 30 is constructed of magnetic layers, i.e., the cores 12, 33a, 33b, 13, which are positioned in the insulating layers 31a, 31b, 31c. Since the insulating layers 31a, 31b, 31c are flat and free from surface steps or irregularities, they allow patterns to be fabricated therein by photolithography. The magnetic cores 12, 33a, 33b, 13 and the coil 19 can therefore be fabricated with high dimensional accuracy and in small sizes. As a consequence, the thin-film magnetic head 30 is low in magnetic reluctance and of good performance.

A process of manufacturing the thin-film magnetic head 30 will hereinafter be described, step by step, with reference to FIGS. 2A through 2K.

Figure 2A:
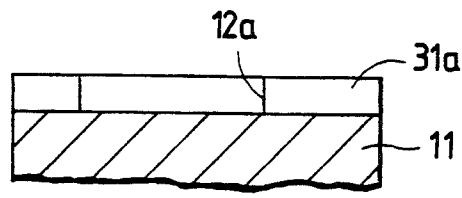
FIGS. 2A through 2K are fragmentary cross-sectional views showing successive steps of a process of fabricating the thin-film magnetic head shown in FIG. 1.

STEP 1: As shown in FIG. 2A, an insulating layer 31a of $SiO_2$, $TiO_2$, $Al_2O_3$, $WO_3$, or the like is deposited on the upper surface of a substrate 11 to a thickness ranging from about 1 μm to 10 μm by a vacuum thin-film fabrication process such as sputtering, evaporation, chemical vapor deposition, or the like. Then, a groove 12a is defined in the insulating layer 31a by photolithography and etching.

Figure 2B:
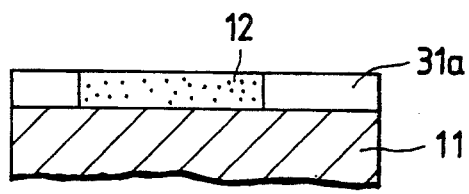

STEP 2: As shown in FIG. 2B, a magnetic layer of a magnetic material such as a soft magnetic material, e.g., Fe, Co, Ni, or the like, is formed in the groove 12a by a vacuum thin-film fabrication process or plating, to a thickness greater than the depth of the groove 12a. Any excess magnetic material projecting upwardly from the groove 12a, i.e., beyond the upper surface of the insulating layer 31a, is ground away, thereby producing a lower magnetic core 12 which has a flat upper surface that lies flush with the upper surface of the insulating layer 31a.

Figure 2C:
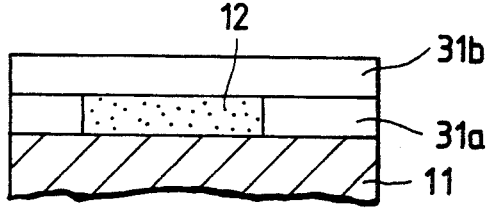

STEP 3: As shown in FIG. 2C, an intermediate insulating layer 31b $SiO_2$, $TiO_2$, $Al_2O_3$, $WO_3$, or the like is deposited on the flat upper surface of the insulating layer 31a, including the lower magnetic core 12, to a thickness ranging from about 1 μm to 5 μm by a vacuum thin-film fabrication process.

Figure 2D:
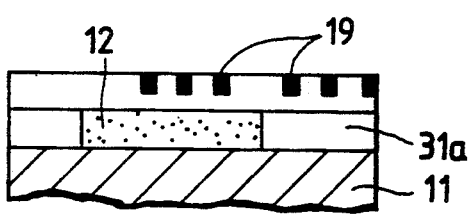

STEP 4: As shown in FIG. 2D, a spiral multiturn groove is defined in the intermedaite insulating layer 31b in the same manner as the groove 12a, except that the bottom of the spiral multiturn groove terminates short of the lower magnetic core 12. Thereafter, a conductor layer of Cu, Al, Au, Ag, or the like is formed in the spiral multiturn groove by a vacuum thin-film fabrication process. Any excessive conductor material projecting upwardly from the groove is ground away, or the conductor is leveled off, thereby forming a spiral coil 19 in the intermediate insulating layer 31b.

Figure 2E:
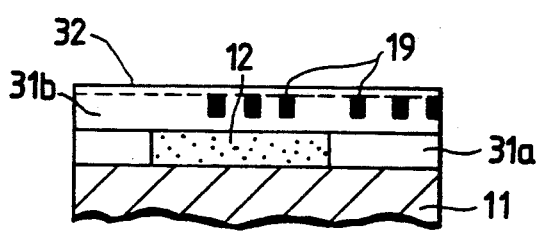

STEP 5: As illustrated in FIG. 2E, another insulating layer 32, which may be of the same material as the intermediate insulating layer 31b, is deposited on the intermediate insulating layer 31b, inlcuding the coil 19, to a thickness ranging from 0.1 μm to 1 μm.

Figure 2F:
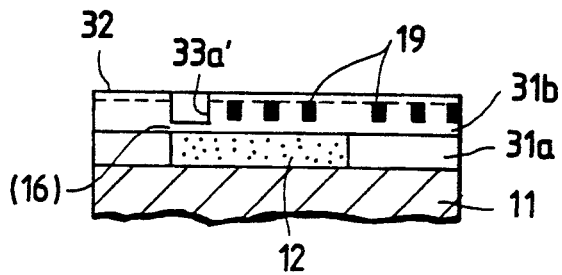

STEP 6: As shown in FIG. 2F, a groove 33a' is defined in the insulating layers 32, 31b by photolithography or etching, leaving a layer of the insulating material on the lower core 12, which layer serves as a magnetic gap 16 (described later). The groove 33a' has parallel side walls extending across the insulating layers 32, 31b.

One of the side walls of the grooves 33a' lies substantially flush with one end of the lower core 12.

Figure 2G:
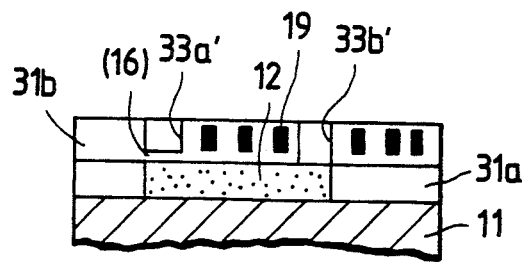

STEP 7: As shown in FIG. 2G, another groove 33b' is defined in the insulating layers 32, 31b by photolithography or etching, the groove 33b' extending all the way down to the lower core 12 which is therefore partly exposed at the bottom of the groove 33b'. The groove 33b' has parallel side walls extending across the insulating layers 32, 31b, and one of the side walls lies substantially flush with the other end of the lower core 12. The groove 33b' is positioned substantially at the center of the spiral pattern of the coil 19.

Figure 2H:
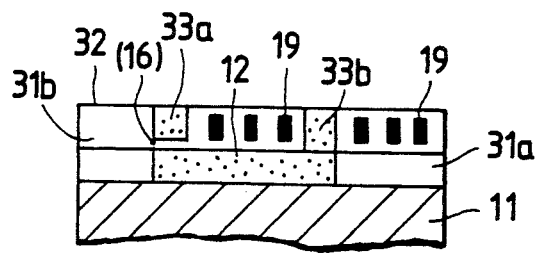

STEP 8: As illustrated in FIG. 2H, layers of a soft magnetic material are formed respecitvely in the grooves 33a', 33b' by a vacuum thin-film fabrication process, and any excessive material is removed to produce intermediate cores 33a, 33b which have flat upper surfaces flush with the upper surface of the insulating layer 32.

Figure 2I:
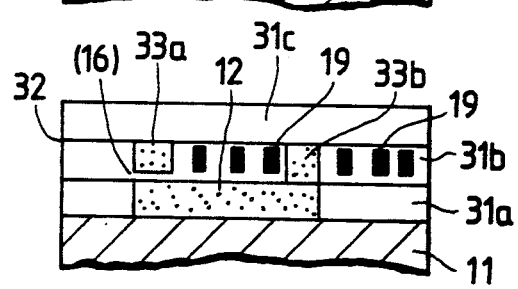

STEP 9: As shown in FIG. 2I, an upper insulating layer 31c of $SiO_2$, $TiO_2$, $Al_2O_3$, $WO_3$, or the like is deposited on the upper surface of the insulating layer 32, including the intermediate cores 33a, 33b, to a thickness ranging from about 1 μm to 10 μm by a vacuum thin-film fabrication process.

Figure 2J:
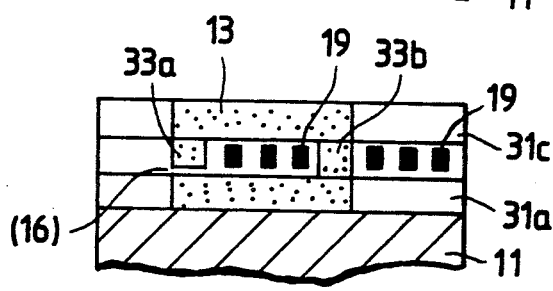

STEP 10: As shown in FIG. 2J, an upper magnetic core 13 is formed in the upper insulating layer 31c in the same manner as the lower magnetic core 12. The upper magnetic core 13 is held in substantial vertical alignment with the lower magnetic core 12.

Figure 2K:
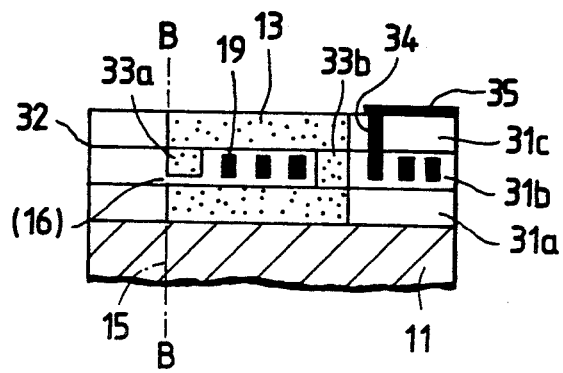

STEP 11: As shown in FIG. 2K, a through hole 34 is defined in the upper insulating layer 31c and the intermediate insulating layer 31b, and a conductor is filled in the through hole 34 so as to be connected to one end of the coil 19. An external lead 35 is deposited on the upper insulating layer 31c by a vacuum thin-film fabrication process or plating, the lead 35 being electrically connected to the conductor filled in the through hole 34. Finally, the entire structure is cut off along a line B—B, thus producing a sliding surface 15 at which the magnetic gap 16 is exposed endways. Now, the thin-film magnetic head 30 shown in FIG. 1 is completed.

Figure 3:
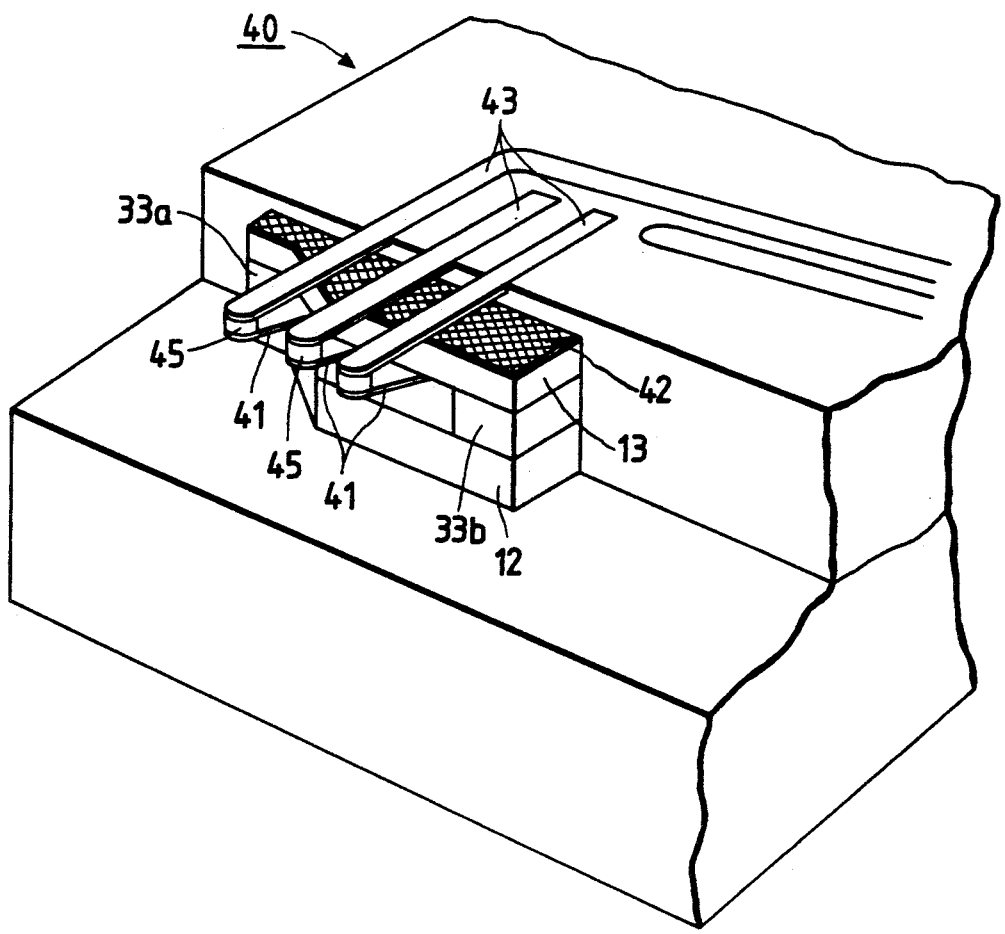
FIG. 3 is a perspective view of a thin-film magnetic head according to another embodiment of the present invention.

FIG. 3 shows in perspective a thin-film magnetic head 40 according to another embodiment of the present invention.

According to the embodiment shown in FIG. 3, the thin-film magnetic head 40 differs from the thin-film magnetic head 30 shown in FIG. 1 in that it has two coils 41, 43 which are vertically spaced from and electrically connected to each other. The coil 41 is embedded in the intermediate insulating layer 31b, whereas the coil 43 is deposited on an insulating film 42 on the upper core 13. The coils 41, 43 are connected to each other by conductors 45 which are filled in through holes (not shown) defined in the upper core 13. With the arrangement shown in FIG. 3, the coils 41, 43 are made smaller than the coil 19 in the thin-film magnetic head 30 shown in FIG. 1, and hence has a smaller electric resistance than the coil 19. Accordingly, the thin-film magnetic head 40 is better in performance. Moreover, the structure shown in FIG. 3 makes it possible to fabricate a multitrack thin-film magnetic head with a higher track density.

Figure 4:
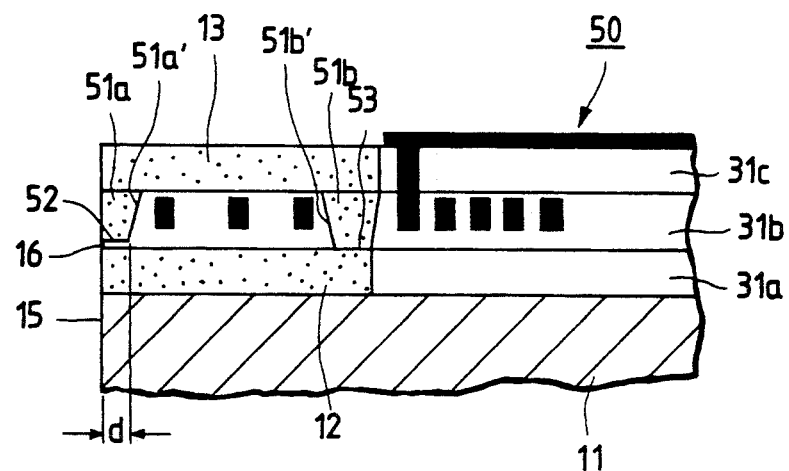
FIG. 4 is a fragmentary cross-sectional view of a thin-film magnetic head according to still another embodiment of the present invention.

A thin-film magnetic head according to still another embodiment of the present invention is shown in FIG. 4.

The thin-film magnetic head, generally designated by the reference numeral 50 in FIG. 4, is similar to the thin-film magnetic head 30 shown in FIG. 1 except that intermediate magnetic cores 51a, 51b have respective inner side walls 51a', 51b' which do not extend parallel to the transverse direction of the intermediate insulating layer 31b, but which are inclined progressively away from each other in the downward direction, i.e., the intermediate magnetic cores 51a, 51b are disposed respectively in grooves 52, 53 defined in the intermediate insulating layer 31b and progressively tapered toward the lower core 12. The intermediate magnetic core 51a terminates short of the lower core 12, with the magnetic gap 16 left therebetween.

The tapered intermediate magnetic core 51a concentrates magnetic fluxes in the magnetic gap 16 for effective magnetic recording on a magnetic recording medium on the sliding surface 15. Another advantage of the tapered intermediate magnetic core 51a is as follows: The service life of the thin-film magnetic head 50 is determined by the gap depth d of the magnetic gap 16. Stated otherwise, when the magnetic gap 16 is worn away or the gap width d is eliminated, the thin-film magnetic head 50 is no longer operative. Since the intermediate magnetic core 51a is tapered toward the magnetic gap 16, the magnetic path across the magnetic gap 16 between the cores 51a, 12 will not be interrupted or cut off by wear of the intermediate magnetic core 51a before the magnetic gap 16 is worn away or the gap depth d is eliminated. As a result, no magnetic saturation is caused and efficient magnetic recording is possible until the magnetic gap 16 is completely removed due to wear.

The thin-film magnetic head 50 is fabricated essentially in the same process as the fabrication process shwon in FIGS. 2A through 2K except STEPS 6 and 7 shown in FIGS. 2F and 2G, respectively. To fabricate the thin-film magnetic head 50, a groove 52 having no parallel side walls across the intermediate insulating layer 31a and tapered toward the lower core 12 is defined in the intermediate insulating layer 31a by RIE (reactive ion etching), for example, in STEP 6, with an insulating layer being left as the magnetic gap 16. Then, a groove 53 having no parallel side walls across the intermediate insulating layer 31a and tapered toward the lower core 12 is defined in the intermediate insulating layer 31a by RIE in STEP 7, the groove 53 reaching the lower core 12. Such grooves 52, 53 are formed by depositing a mask of a photoresist or the like on the intermediate insulating layer 31b and etching the intermediate insulating layer 31b through the mask with a gas which has a not much higher etch rate (i.e., a low selective rate on the order of two to four) for the intermediate insulating layer 31b as compared with that for the mask. Each of the grooves 52, 53 thus formed has no parallel side walls, i.e., inclined side walls, across the intermediate insulating layer 31b and has a bottom area smaller than an upper opening area.

Figure 5:
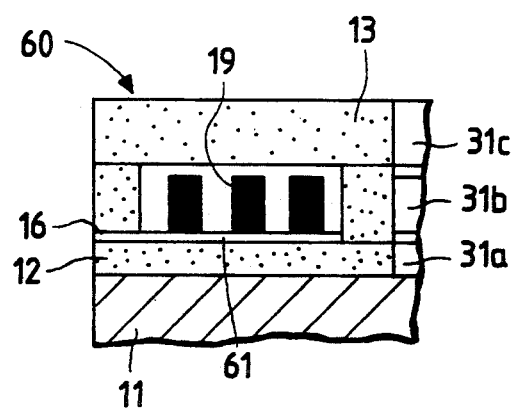
FIG. 5 is a fragmentary cross-sectional view of a thin-film magnetic head according to yet another embodiment of the present invention.

FIG. 5 shows a thin-film magnetic head according to yet another embodiment of the present invention.

The thin-film magnetic head, generally designated at 60 in FIG. 5, differs from the thin-film magnetic head 30 shown in FIG. 1 except that a dry-etching resistant layer or stopper layer 61 is disposed on at least the upper surface of the lower magnetic core 12.

The dry-etching resistant layer 61 is made of an insulating material such as a metal oxide or a metal fluoride, e.g., $CaTiO_3$, $BaTiO_3$, $\alpha$-$Fe_2O_3$, $ZrO_2$, $MgAl_2O_4$, $MgF_2$, $CaF_2$, or the like which has a lower dry etch rate than the material of the intermediate insulating layer 31b, e.g., SiO₂, TiO₂, Al₂O₃, WO₃, or the like. One end of the dry-etching layer 61 serves as the magnetic gap 16.

When the groove for receiving the coil 19 is formed in the intermediate insulating layer 31b by dry etching, the dry-etching resistant layer 61 which has already been deposited on the lower magnetic core 12 prevents the groove from reaching the lower magnetic core 12. Therefore, the coil 19 and the lower magnetic core 12 are reliably insulated from each other. Consequently, the dry-etching resistant layer 61 allows the groove to be formed to a large depth and hence the coil 19 to be formed to a large thickness. The coil 19 thus formed has a low electric resistance. The thin-film magnetic head 60 therefore has a high S/N ratio. The dry-etcing resistant layer 61 also provides a sufficient insulation between the lower magnetic core 12 and the coil 19.

Figure 6:
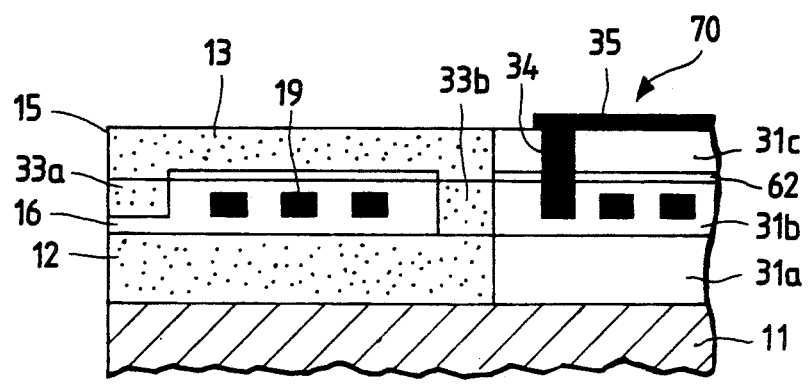
FIG. 6 is a fragmentary cross-sectional view of a thin-film magnetic head according to a further embodiment of the present invention.

FIG. 6 illustrates a thin-film magnetic head, generally denoted at 70, according to a further embodiment of the present invention. In FIG. 6, a dry-etching resistant layer or stopper layer 62 is disposed beneath the upper magnetic core 13 above the coil 19. The dry-etching resistant layer 62 is effective in preventing the coil 19 from being etched when the upper magnetic core 13 is deposited. Consequently, the coil pattern 19 is kept out of contact with the upper magnetic core 13.

Figure 7A:
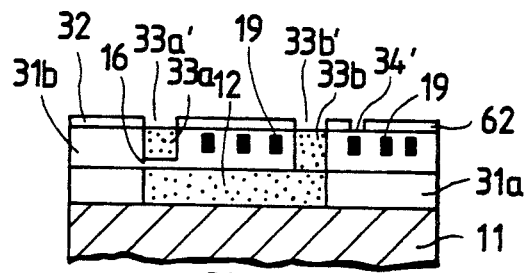
FIGS. 7A through 7D are fragmentary cross-sectional views showing four steps of a process of fabricating the thin-film magnetic head illustrated in FIG. 6.
Figure 7B:
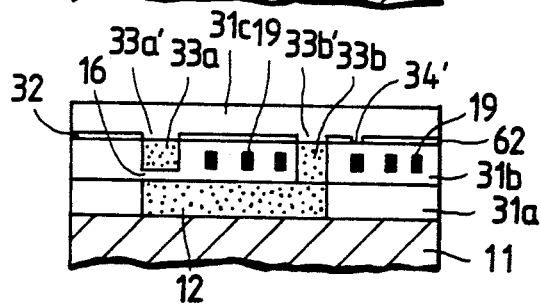
Figure 7C:
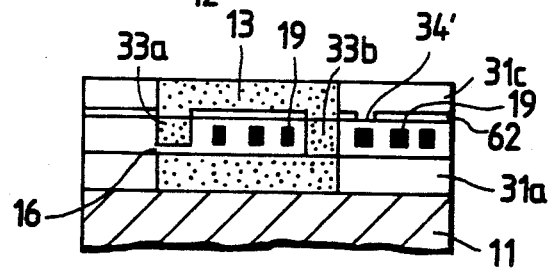
Figure 7D:
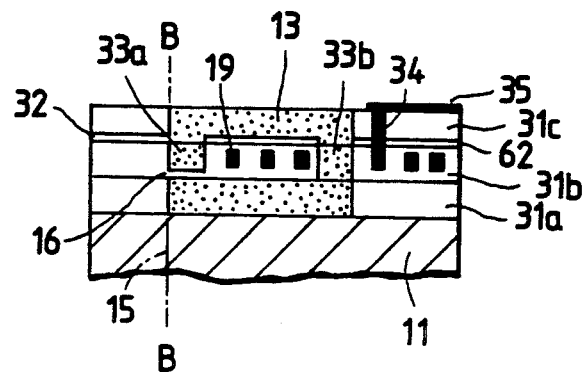

A process of fabricating the thin-film magnetic head 70 will be described below with reference to FIGS. 7A through 7D. A dry-etching resistant layer 62 made of an insulating material such as a metal oxide or a metal fluroide, e.g., CaTiO₃, BaTiO₃, α-Fe₂O₃, ZrO₂, MgAl₂O₄, MgF₂, CaF₂, or the like, is deposited on the intermediate insulating layer 31b by a vacuum thin-film fabrication process, as shown in FIG. 7A. Grooves 33a', 33b', and 34' are defined in the dry-etching resistant layer 62 by photolithography or ion milling, the groove 34' being used to facilitate the subsequent formation of a through hole. Thereafter, an upper insulating layer 31c is deposited on the upper surface of the dry-etching resistant layer 62, as shown in FIG. 7B. Then, as shown in FIG. 7C, an upper magnetic core 13 is formed in the upper insulating layer 31c, the upper magnetic core 13 having ends joined to the intermediate magnetic cores 33a, 33b through the grooves 33a', 33b'. Then, a through hole 34 is defined in the upper insulating layer 31c and the intermediate insulating layer 31b through the groove 34', and a conductor is filled in the through hole 34 so as to be connected to one end of the coil 19, as shown in FIG. 7D.

In the embodiment shown in FIG. 6, the coil 19 is reliably insulated from the upper magnetic core 13 by the dry-etching resistant layer 62. The dry-etching resistant layer 62 also allows the through hole 34 to be defined sufficiently deeply, so that the coil 19 can reliably be connected to the external lead 35. The external lead 35 can therefore be deposited on the upper insulating layer 31c so as to lie flush with the upper surface of the upper magnetic core 13. The external lead 35 is thus prevented from being short-circuited.

Figure 8:
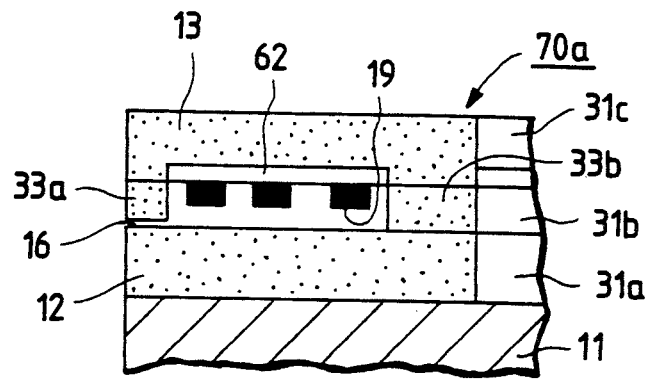
FIG. 8 is a fragmentary cross-sectional view of a modification of the thin-film magnetic head shown in FIG. 6.

FIG. 8 shows a modification of the thin-film magnetic head 70 illustrated in FIG. 6. The modified thin-film magnetic head, generally denoted at 70a, has an upper insulating layer 31c (with an upper core 13 embedded therein) deposited directly on an upper surface of a coil 19.

Figure 9:
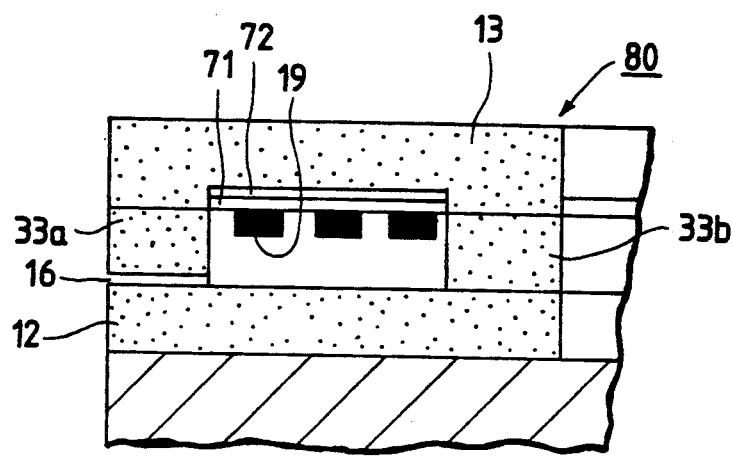
FIG. 9 is a fragmentary cross-sectional view of a thin-film magnetic head according to a still further embodiment of the present invention.

FIG. 9 shows a thin-film magnetic head 80 according to a still further embodiment of the present invention. The thin-film magnetic head 80 differs from the thin-film magnetic head 70 shown in FIG. 8 in that an insulating layer 71 made of SiO₂, TiO₂, Al₂O₃, WO₃, or the like and having a higher etch rate is deposited on the intermediate insulating layer 31b over the coil 19, and a dry-etching resistant layer or stopped layer 72 made of a metal such as Ni, Fe, Co, Al, or the like and having lower etch rate is deposited on the insulating layer 71.

The selective ratio of the insulating dry-etching resistant layer 61 (FIG. 5) or 62 (FIG. 6) made of a metal oxide or a metal fluoride ranges from 5 to 10, while the selective ratio of the dry-etching resistant layer 72 is 25 fo Ni, in the range of from 20 to 30 for Co, from 10 to 20 for Fe, and 10 for Al. That is, the selective ratios of these metals used as the material of the dry-etching resistant layer 72 are greater by several times than the selective ratio of the insulating dry-etching resistant layer. Therefore, the dry-etching resistant layer 72 can be made thinner and can be selectively etched with greater accuracy. Furthermore, the dry-etching resistant layer 72 can also be selectively etched highly accurately by the wet etching process.

Figure 10:
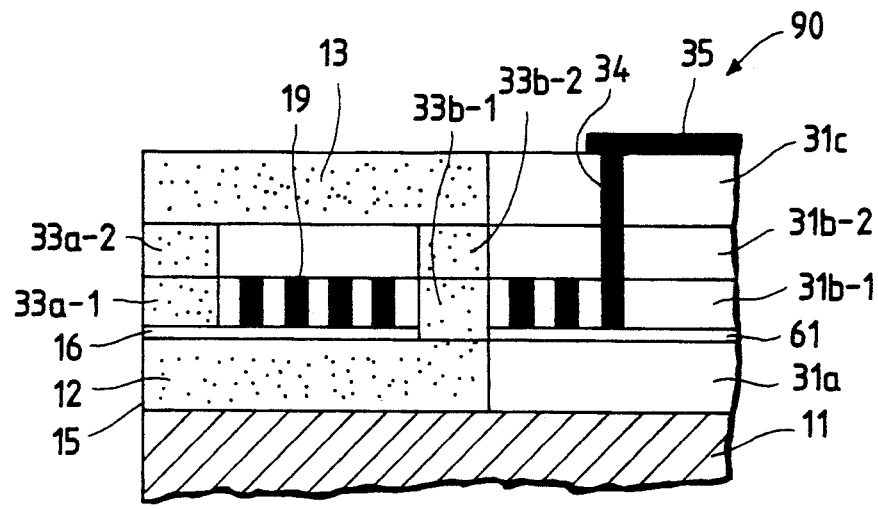
FIG. 10 is a fragmentary cross-sectional view of a thin-film magnetic head according to a yet further embodiment of the present invention.

FIG. 10 shows a thin-film magnetic head according to a yet further embodiment of the present invention.

The thin-film magnetic head, generally denoted at 90 in FIG. 10, is different from the thin-film magnetic head 60 shown in FIG. 5 in that the intermediate insulating layer comprises a plurality of insulating layers. More specifically, the intermediate insulating layer comprises a lower intermediate insulating layer 31b-1 deposited on the insulating dry-etching resistant layer 61 and an upper intermediate insulating layer 31b-2 deposited on the lower intermediate insulating layer 31b-1. In the lower intermediate insulating layer 31b-1, there are embedded an intermediate magnetic core 33a-1 positioned at the sliding surface 15 and directly above the magnetic gap 16 and an intermediate magnetic core 33b-1 spaced inwardly from the intermediate magnetic core 33a-1 and directly joined to the lower magnetic core 12. Two other intermediate magnetic cores 33a-2, 33b-2 are embedded in the upper intermediate insulating layer 31b-2 in direct contact with the intermediate magnetic cores 33a-1, 33b-1, respectively. Therefore, the intermediate magnetic core 33a-2 is positioned at the sliding surface 15, and the intermediate magnetic core 33b-2 is spaced inwardly from the intermediate magnetic core 33a-2.

The spiral coil 19 is embedded in the lower intermediate insulating layer 31b-1 in surrounding relation to the intermediate magnetic core 33b-1. The coil 19 has an end connected to a conductor placed in the through hole 34 which is defined in the upper insulating layer 31c and the upper and lower intermediate insulating layers 31b-2, 31b-1. The conductor is connected to the external lead 35 on the upper surface of the upper insulating layer 31c for electric connection to an external device.

The upper magnetic core 13 embedded in the upper insulating layer 31c is held in contact with the intermediate magnetic cores 33a-2, 33b-2 in the upper intermediate insulating layer 31b-2. Consequently, the lower core 12, the intermediate cores 33a-1, 33b-1, 33a-2, 33b-2, and the upper core 13 jointly constitute the magnetic circuit of the thin-film magnetic head 90.

Since there are upper and lower intermediate insulating layers, the intermediate magnetic cores in the combined intermediate insulating layers are relatively thick and free of voids. The relatively thick, void-free intermediate magnetic layers are effective in reducing leakage fluxes between the upper and lower magnetic cores. Accordingly, the thin-film magnetic head 90 is of a small magnetic reluctance and therefore of high performance.

The thin-film magnetic head may have more than three layers of intermediate magnetic cores for an increased distance between the upper and lower magnetic cores and hence for a reduction in leakage fluxes.

Figure 11:
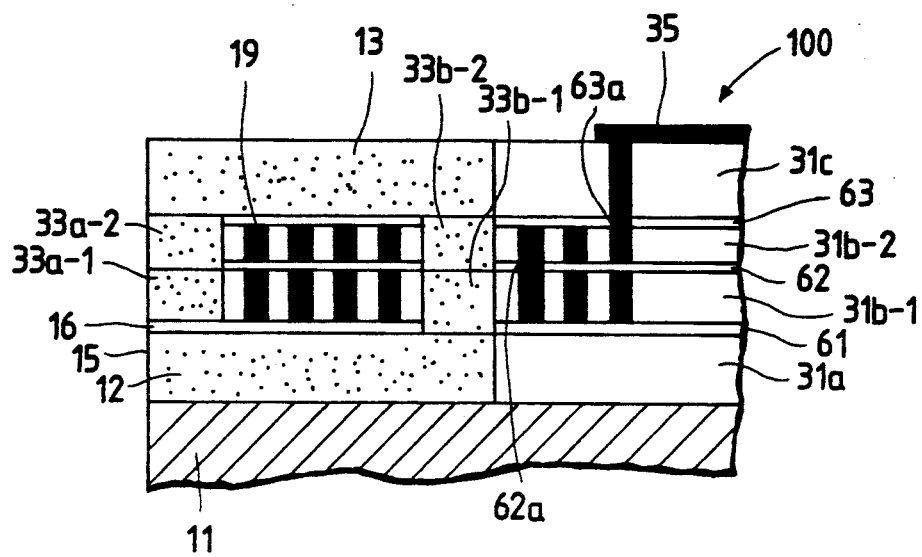
FIG. 11 is a fragmentary cross-sectional view of a thin-film magnetic head according to a yet still further embodiment of the present invention.

FIG. 11 illustrates a thin-film magnetic head, generally denoted at 100, according to a yet still further embodiment of the present invention. The thin-film magnetic head 100 is similar to the thin-film magnetic head 90 shown in FIG. 10 except that coils 19 are embedded respectively in the lower and upper intermediate insulating layers 31b-1, 31b-2, and dry-etching resistant layers or stopper layers 62, 63 are interposed between the intermediate insulating layers 31b-1, 31b-2 and between the intermediate insulating layer 31b-2 and the upper insulating layer 31c, repectively.

The dry-etching resistant layer 62 has a through hole 62a and the dry-etching resistant layer 63 has one through hole 63a. The through hole 62a receives a conductor which interconnects the coils 19 in the lower and upper intermediate insulating layers 31b-1, 33b-2, and the through holes 63a receives a conductor which interconnects the coil 19 in the upper intermediate insulating layer 31b-2 and the external lead 35.

A process of manufacturing the thin-film magnetic head 100 will hereinafter be described, step by step, with reference to FIGS. 12A through 12K.

Figure 12A:
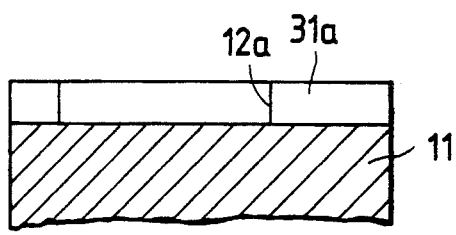
FIGS. 12A through 12K are fragmentary cross-sectional views showing successive steps of a process of fabricating the thin-film magnetic head illustrated in FIG. 11.

STEP 1: As shown in FIG. 12A, an insulating layer 31a of $SiO_2$, $TiO_2$, $Al_2O_3$, $WO_3$, or the like is deposited on the upper surface of a substrate 11 to a thickness ranging from about 1 $\mu$m to 10 $\mu$m by a vacuum thin-film fabrication process such as sputtering, evaporation, chemical vapor deposition, or the like. Then, a groove 12a is defined in the insulating layer 31a by photolithography and etching.

Figure 12B:
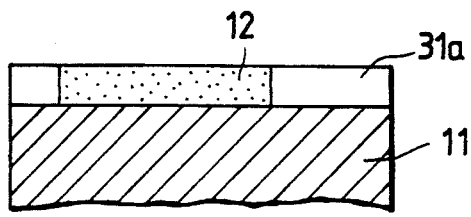

STEP 2: As shown in FIG. 12B, a magnetic layer of a magnetic material such as a soft magnetic material, e.g., Fe, Co, Ni, or the like, is formed in the groove 12a by a vacuum thin-film fabrication process or plating, to a thickness greater than the depth of the groove 12a. Any excess magnetic material projecting upwardly from the groove 12a, i.e., beyond the upper surface of the insulating layer 31a, is ground away, thereby producing a lower magnetic core 12 which has a flat upper surface that lies flush with the upper surface of the insulating layer 31a.

Figure 12C:
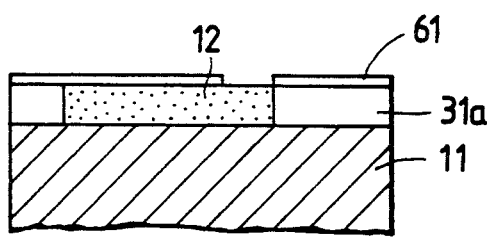

STEP 3: As shown in FIG. 12C, a dry-etching resistant layer or stopper layer 61 is deposited on the upper surface of the flat insulating layer 31a including the lower magnetic core 12, except for a region on one end of the lower magnetic core 12. The dry-etching resistant layer 61 is amde of a material having a lower etch rate than the lower insulating layer 31a, such as $CaTiO_3$, $BaTiO_3$, $\alpha$-$Fe_2O_3$, $ZrO_2$, $MgAl_2O_4$, $MgF_2$, $CaF_2$, or the like.

Figure 12D:
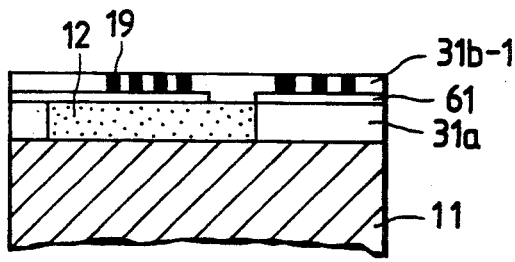

STEP 4: As shown in FIG. 12D, a lower intermediate insulating layer 31b-1, which is of the same material as the lower insulating layer 31c, is deposited on the dry-etching resistant layer 61, and a spiral coil 19 of a cnductive material is formed in the lower intermediate insulating layer 31b-1.

Figure 12E:
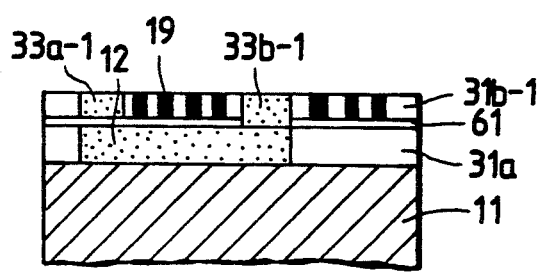

STEP 5: As illustrated in FIG. 12E, intermediate magnetic cores 33a-1, 33b-1 are formed in the lower intermediate diate insulating layer 31b-1 in the same manner as the lower magnetic core 12. The end of the dry-etching resistant layer 61 below the lower intermediate magnetic core 33a-1 serves as a magnetic gap 16.

Figure 12F:
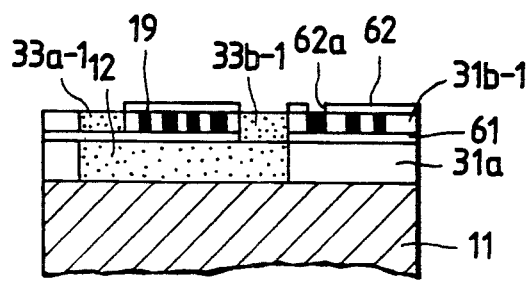

STEP 6: As shown in FIG. 12F, another dry-etching resistant layer or stopper layer 62, which is of the same material as the dry-etching resistant layer 61, is deposited on the lower intermediate insulating layer 31b-1 including the coil 19 therein. A through hole 62a is defined in the dry-etching resistant layer 62 over an inner end of the coil 19 adjacent to the intermediate magnetic core 33b-1 remotely from the intermediate magnetic core 33a-1. and grooves are also defined in the dry-etching resistant layer 62 over the intermediate magnetic cores 33a-1, 33b1.

Figure 12G:
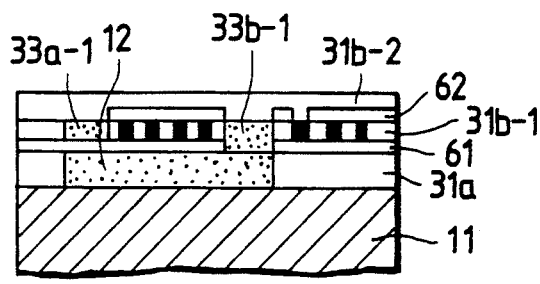

STEP 7: As shown in FIG. 12G, an upper intermediate insulating layer 31b-2 is deposited on the dry-ethching resistant layer 62, the lower intermediate insulating layer 31b-1, and the intermediate magnetic cores 33a-1, 33b-1, while filling the through hole 62a and the grooves in the dry-etching resistant layer 62.

Figure 12H:
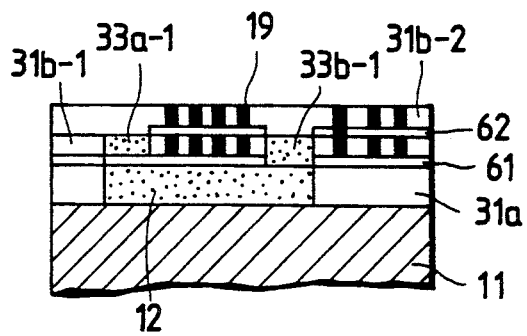

STEP 8: As shown in FIG. 12H, another spiral coil 19 of conductive material is formed in the upper intermediate insulating layer 31b-2.

Figure 12I:
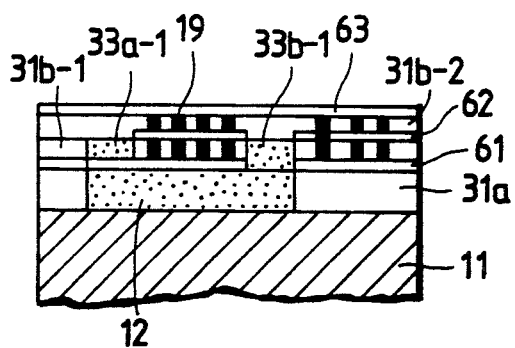

STEP 9: As shown in FIG. 12I, still another dry-etching resistant layer or stopper layer 63, which is of the same material as the dry-etching resistant layers 61, 62, is deposited on the upper intermediate insulating layer 31b-2 including the coil 19 therein. Grooves are defined in the dry-etching resistant layer 63 and the upper intermediate insulating layer 31b-2 over the intermediate magnetic cores 33a-1, 33b-1, respectively.

Figure 12J:
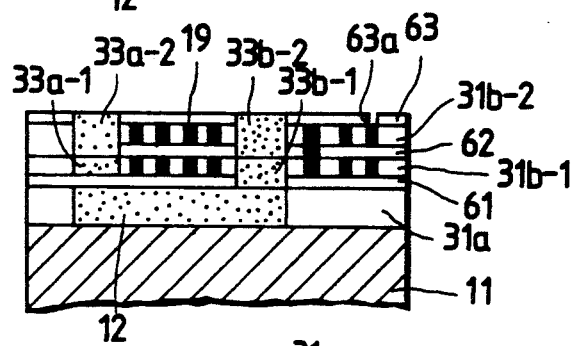

STEP 10: As shown in FIG. 12J, intermediate magnetic cores 33a-2, 33b-2 are formed in the grooves in the dry-etching resistant layer 63 and the upper intermediate insulating layer 31b-2, and held in direct contact with the intermediate magnetic cores 33a-1, 33b-1, respectively. A through hole 63a is defined in the dry-etching resistant layer 63 over an outer end of the coil 19 in the upper intermediate insulating layer 31b-2.

Figure 12K:
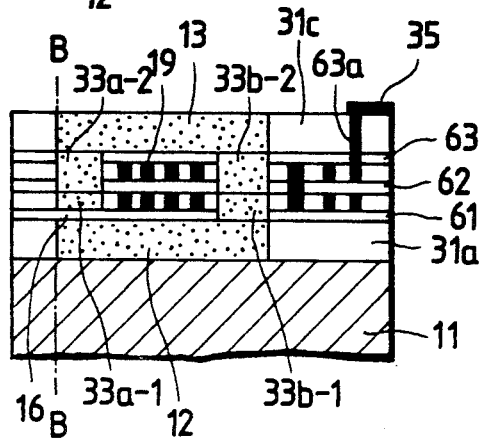

STEP 11: As shown in FIG. 12K, an upper insulating layer 31c is deposited on the dry-etching resistant layer 63, and an upper magnetic core 13 is formed in the upper insulating layer 31c in contact with the intermediate magnetic cores 33a-2, 33b-2. A conductor is embedded in the through hole 63a and also in the upper insulating layer 63, and connected to one end of an external lead 35 which is deposited on the upper insulating layer 31c. Finally, the entire structure is cut off along a line B—B, thus producing a sliding surface 15 at which the magnetic gap 16 is exposed endways. Now, the thin-film magnetic head 100 shown in FIG. 11 is completed.

In the thin-film magnetic head 100, the upper and lower magnetic cores 13, 12 are widely spaced apart from each other by a plurality of layers of intermediate magnetic cores. Accordingly, any leakage fluxes between the upper and lower magnetic cores 13, 12 are reduced. The magnetic layers of intermediate magnetic cores are free of voids. Therefore, the thin-film magnetic head 100 has a reduced magnetic reluctance. The multilayer coils 19 improve the magnetic characteristics of the thin-film magnetic head 100. The dry-etching resistant layer or stopper layers 61, 62 below the coils 19 allow the coils 19 to be formed to an increased thickness for higher performance of the thin-film magnetic head 100. The thin-film magnetic head 100 may be constructed to have more than two coil layers.

Figure 13:
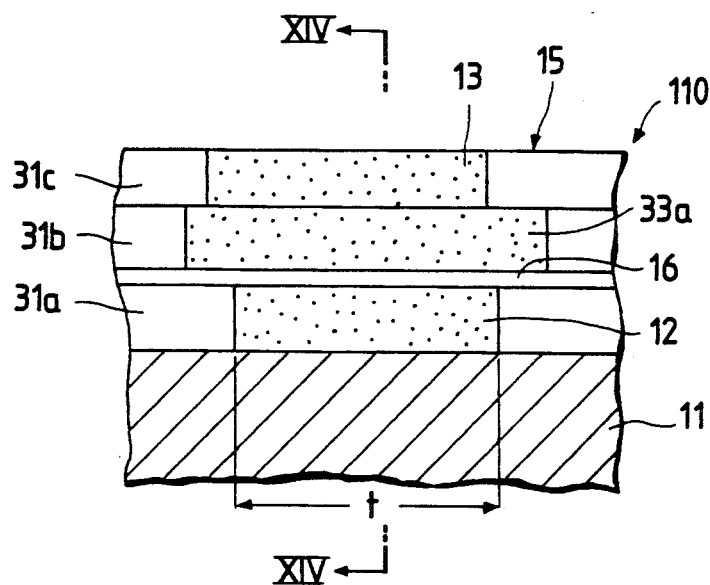
FIG. 13 is a fragmentary cross-sectional view of a thin-film magnetic head according to another embodiment of the present invention.
Figure 14:
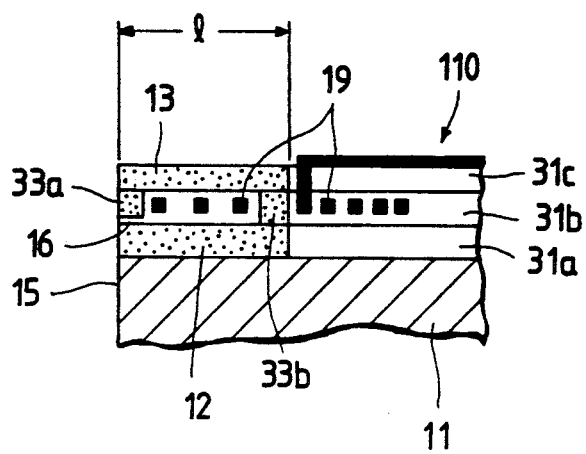

FIGS. 13 and 14 show a thin-film magnetic head according to another embodiment of the present invention. The thin-film magnetic head, generally designated by the reference numeral 110, has a flat lower insulating layer 31a, a flat intermediate insulating layer 31b, and a flat upper insulating layer 31c, as with the thin-film magnetic head 30 shown in FIG. 1.

The lower insulating layer 31a includes a lower magnetic core 12 with one side exposed on the sliding surface 15. The intermediate insulating layer 31b includes two front and rear intermediate magnetic cores 33a, 33b spaced from each other, the front intermediate magnetic core 33a having one side exposed on the sliding surface 15. The upper insulating layer 31c includes an upper magnetic core 13 with one side exposed on the sliding surface 15. The magnetic gap 16 is defined between the lower magnetic core 12 and the front intermediate magnetic core 33a.

As shown in FIG. 13, the front intermediate magnetic core 33a has a width (in the horizontal direction in FIG. 13) sufficiently greater than the width of the lower magnetic core 12. The required track width t of the thin-film magnetic head 110 is defined by the width of the lower magnetic core 12. In the process of fabricating the thin-film magnetic head, it is possible to keep an actual track width equal to the required track width t defined by the width of the lower magnetic core 12. As the width of the front intermediate magnetic core 33a is sufficiently large, the area of the bottom of a groove which receives the front intermediate magnetic core 33a in the intermediate insulating layer 31b is sufficiently large as compared with the depth of the groove. Therefore, no voids are produced in the front intermediate magnetic core 33a, which is thus of a low magnetic reluctance.

The width of the upper magnetic core 13 is shown as being smaller than the width of the front intermediate magnetic core 33a. However, the width of the upper magnetic core 13 may be greater than the width of the front intermediate magnetic core 33a.

As shown in FIG. 14, the length l of the lower magnetic core 12 in the direction normal to the sliding surface 15 is much larger than the corresponding length of the front intermediate magnetic core 33a. Consequently, the area of the bottom of a groove which receives the lower magnetic core 12 is sufficiently large as compared with the depth of the groove. Thus, no voids are produced in the lower magnetic core 12 even if its width is defined as the required track width t.

The width of the front intermediate magnetic core 33a is greater than the widths of the upper and lower magnetic cores 13, 12. Therefore, the upper and lower magnetic cores 13, 12 are isolated from each other by the front intermediate magnetic core 33a, so that no false gaps are formed between the upper and lower magnetic cores 13, 12. As a consequence, the thin-film magnetic head 110 has good crosstalk characteristics.

Figure 15:
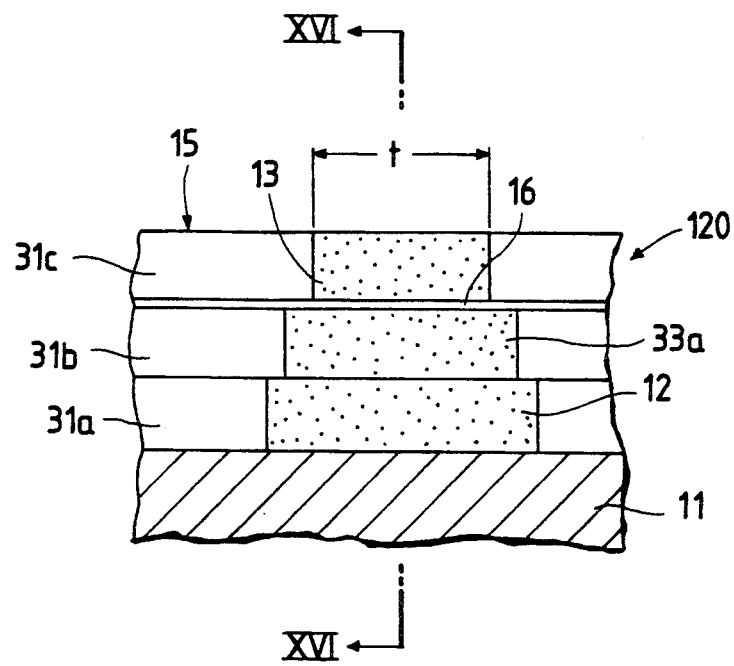
FIG. 15 is a fragmentary cross-sectional view of a thin-film magnetic head according to still another embodiment of the present invention.
Figure 16:
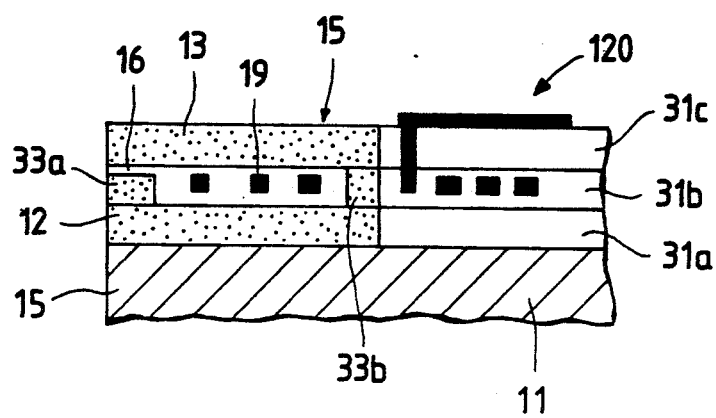
FIG. 16 is a cross-sectional view taken along line XVI—XVI of FIG. 15.

FIGS. 15 and 16 show a thin-film magnetic head according to still another embodiment of the present invention. The thin-film magnetic head, generally designated by the reference numeral 120, differs from the thin-film magnetic head 110 shown in FIGS. 13 and 14, in that the magnetic gap 16 is defined between the upper magnetic core 13 and the front intermediate magnetic core 12, the track width t is defined by the width of the upper magnetic core 13, and the width of the lower magnetic core 12 is larger than the width of the front intermediate magnetic core 33a. The arrangement shown in FIG. 15 is also effective to prevent voids from being produced in the cores 12, 33a, 13 and also to create false gaps.

While the width of the lower magnetic core 12 is shown as being larger than the width of the front intermediate magnetic core 33a, the width of the lower magnetic core 12 may be smaller than the width of the front intermediate magnetic core 33a.

Although certain preferred embodiments have been shown and described, it should be understood that many changes and modifications may be made therein without departing from the scope of the appended claims.

We claim as our invention:

1. A thin-film magnetic head comprising:
   a substrate;
   a first insulating layer having a groove disposed on said substrate;
   a first magnetic core filling said groove in said first insulating layer;
   a second insulating layer having two separate grooves disposed on said first insulating layer;
   two second magnetic cores each filling a corresponding one of said grooves in said second insulating layer with one of said second magnetic cores contacting said first magnetic core,
   a third insulating layer having a groove disposed on of said second insulating layer;
   a third magnetic core filling said groove in said third insulating layer and contacting the one of said second magnetic cores contacting said first magnetic core,
   a coil embedded in said second insulating layer to surround the one of said second magnetic cores contacting said first and third magnetic cores;
   said first, second, and third magnetic cores jointly providing a magnetic circuit, a magnetic gap being provided between either of said first or third magnetic core and said second magnetic core not surrounded by said coil.

2. A thin-film magnetic head according to claim 1, wherein said second magnetic core surrounded by said coil has parallel side walls extending through said second insulating layer.

3. A thin-film magnetic head according to claim 1, wherein said second magnetic core not surrounded by said coil has an inclined side wall tapered toward said magnetic gap.

4. A thin-film magnetic head according to claim 1, wherein said magnetic gap is defined between said first magnetic core and said second magnetic core not surrounded by said coil.

5. A thin-film magnetic head according to claim 1, wherein said magnetic gap is defined between said second magnetic core not surrounded by said coil and said third magnetic core.

6. A thin-film magnetic head according to claim 1, further including a dry-etching resistant layer interposed between said first and second insulating layers.

7. A thin-film magnetic head according to claim 1, further including a dry-etching resistant layer interposed between said second and third insulating layers.

8. A thin-film magnetic head according to claim 6, wherein said magnetic gap is defined by said dry-etching resistant layer.

9. A thin-film magnetic head according to claim 1, further including an external lead disposed on a second surface of said third insulating layer and connected to said coil.

10. A thin-film magnetic head according to claim 1, wherein said second insulating layer comprises a plurality of intermediate insulating layers.

11. A thin-film magnetic head according to claim 10, wherein said coil is embedded in one of said intermediate insulating layers.

12. A thin-film magnetic head according to claim 10, wherein said coil is embedded in each of said intermediate insulating layers.

13. A thin-film magnetic head according to claim 10, further including a dry-etching resistant layer interposed between said first insulating layer and one of said intermediate insulating layers.

14. A thin-film magnetic head according to claim 10, further including a plurality of dry-etching resistant layers interposed between said first insulating layer, said intermediate insulating layers, and said third insulating layers, respectively.

15. A thin-film magnetic head according to claim 1, wherein said first magnetic core, said second magnetic core not surrounded by said coil, and said third magnetic core have respective first, second, and third widths parallel to said magnetic gap, said second width being greater than said first width, said first width defining a track width of the thin-film magnetic head.

16. A thin-film magnetic head according to claim 1, wherein said first magnetic core, said second magnetic core not surrounded by said coil, and said third magnetic core have respective first, second, and third widths parallel to said magnetic gap, said second width being greater than said third width, said third width defining a track width of the thin-film magnetic head.

* * * * *